United States Patent [19]
Kamitakahara et al.

[11] Patent Number: 5,460,766
[45] Date of Patent: Oct. 24, 1995

[54] PROCESS OF MAKING SUBSTRATE FOR AN OPTICAL RECORDING MEDIUM

[75] Inventors: Hirofumi Kamitakahara; Yukitoshi Ohkubo; Naoki Kushida, all of Yokohama; Hitoshi Yoshino, Kawasaki; Osamu Kanome, Yokohama; Tetsuya Sato; Hisanori Hayashi, both of Kawasaki, all of Japan

[73] Assignee: Canon Kabushiki Kaisha, Tokyo, Japan

[21] Appl. No.: 184,058

[22] Filed: Jan. 21, 1994

Related U.S. Application Data

[62] Division of Ser. No. 862,523, Apr. 2, 1992, Pat. No. 5,308,235.

[30] Foreign Application Priority Data

| Apr. 4, 1991 | [JP] | Japan | 3-097909 |
| Jun. 19, 1991 | [JP] | Japan | 3-147467 |

[51] Int. Cl.$^6$ ............................. B29C 47/00; B29C 59/04
[52] U.S. Cl. .................. 264/167; 264/210.2; 264/211.12
[58] Field of Search ................................. 264/1.34, 106, 264/167, 210.2, 211.12

[56] References Cited

U.S. PATENT DOCUMENTS

| 1,018,631 | 2/1912 | Runge | 425/385 |
| 1,030,364 | 6/1912 | Whitman | 425/385 |
| 1,162,256 | 11/1915 | Rotter | 425/385 |
| 1,996,057 | 4/1935 | Buckle | 425/367 |
| 2,529,083 | 11/1950 | Keefe | 425/291 |
| 4,938,677 | 7/1990 | Robbins, III | 425/328 |
| 5,048,745 | 9/1991 | Sato et al. | 228/132 |
| 5,087,192 | 2/1992 | Kanome et al. | 425/385 |
| 5,147,592 | 9/1992 | Sato et al. | 264/167 |
| 5,173,313 | 12/1992 | Sato et al. | 425/183 |

FOREIGN PATENT DOCUMENTS

| 0405582 | 1/1991 | European Pat. Off. . |
| 0405898 | 1/1991 | European Pat. Off. . |
| 0408283 | 1/1991 | European Pat. Off. . |

OTHER PUBLICATIONS

European Search Report (Aug. 1992).

*Primary Examiner*—Leo B. Tentoni
*Attorney, Agent, or Firm*—Fitzpatrick, Cella, Harper & Scinto

[57] ABSTRACT

A roll stamper for forming an information recording medium substrate has a stamper member having a pattern corresponding to a pre-format for an information recording medium formed in its obverse surface, fixation members fixed to both end portions of a reverse surface of the stamper so as to be integral with the stamper member, and fit grooves formed in a circumferential surface of a specular roll base parallel to the axis of the specular roll base. The fixation members are fitted in the fit grooves, and the stamper member is fixed on the circumferential surface of the specular roll base. The roll stamper also includes a mechanism for applying a tensile force to the stamper member. This roll stamper is used in an apparatus having an extruder for melting and extruding a resin to form a resin sheet and a specular roll facing the roll stamper to continuously form the information recording medium substrate.

13 Claims, 11 Drawing Sheets

PROCESS OF MAKING SUBSTRATE FOR AN OPTICAL RECORDING MEDIUM

This application is a division of application Ser. No. 07/862,523 filed Apr. 2, 1992, now U.S. Pat. No. 5,308,235 issued May 3, 1994.

BACKGROUND OF THE INVENTION

1. Field of the Invention

This invention relates to a roll stamper used to continuously manufacture a substrate for a high-density information recording medium such as an optical disk or optical card by transferring a pre-format pattern to a substrate surface, and to an apparatus for forming the high-density information recording medium substrate by using the stamper.

2. Related Background Art

For example, an injection molding method, a compression molding method and an extrusion molding method are known as methods for manufacturing the substrate for a high-density optical recording medium such as an optical disk or optical card.

When the injection molding method or compression method is used, strict conditions are set with respect to the temperature and the pressure of a molten resin and the precision of dies and so on to achieve the desired flatness and smoothness of the substrate, to limit a warp of the substrate and to prevent inclusion of air bubbles in the molten resin, and a large-scale molding machine is therefore required, resulting in an increase in manufacturing cost. In the case of injection molding, it is difficult to manufacture a substrate having a small thickness of 0.4 mm or less and a small double refraction index. In the case of compression molding and injection molding, the productivity is low because molded sheets are separately formed one after another.

An information recording medium substrate may be manufactured by extrusion molding in such a manner that a sheet of a molten resin extruded from an extruder is pressed by a roll stamper to form the substrate while transferring a pre-format pattern for providing a pre-format signal, a tracking signal and the like. Such an extrusion molding process is therefore advantageous in terms of mass production of a substrate and has recently been studied as a method for forming an information recording medium substrate.

Roll stampers to be used to form an information recording medium substrate by extrusion molding as described above have conventionally been manufactured by the following methods:

(1) a method in which a pre-format pattern is directly formed in a circumferential surface of a roll base having the circumferential surface polished to form a specular surface (hereinafter referred to as "specular roll base");

(2) a method in which a flexible stamper having a pre-format pattern previously formed on its surface is uniformly bonded to a specular circumferential surface of a specular roll with an adhesive; and (3) a method in which a flexible stamper having a pre-format pattern previously formed on its surface is fixed to a specular circumferential surface of a specular roll with screws.

In the case of method (1), if a defect is caused in only one portion of the pre-format pattern, the whole roll stamper must be exchanged, and the molding efficiency is therefore low. In the roll stamper manufactured by method (2), the adhesive is changed in quality with time by the heat of the extruded resin sheet or the heat of the roll so that the bonding force is reduced and the stamper may easily come off the specular roll. Therefore, the life of the roll stamper is very short. Moreover, air bubbles are liable to be generated in the adhesive. Unnecessary irregularities in the stamper surface caused by the air bubbles are transferred to the substrate, so that the pattern may not be formed accurately and there is a problem in resulting transfer failure. In the case of the roll stamper manufactured by method (3), it is difficult to limit the gap between the flexible stamper and the roll base, and therefore non-uniformity in the temperature on the stamper surface tends to occur, thereby resulting in molding failure. A method is therefore needed which enables a flexible stamper to be securely fixed on a specular roll base so that the stamper surface (reverse surface) on which no pre-format pattern is formed is brought into close contact with the circumferential surface of the specular roll base while occurrence of a strain in the stamper is prevented.

SUMMARY OF THE INVENTION

The present invention has been achieved in view of the above-described conventional related art, and an object of the present invention is to provide a roll stamper used to form an information recording medium substrate, fixed accurately and securely on a specular roll surface, having a long life, and capable of transferring only a pre-format pattern onto a resin sheet with accuracy.

Another object of the present invention is to provide an apparatus for manufacturing an information recording medium substrate which apparatus enables a pre-format pattern to be transferred onto a resin sheet with accuracy while preventing occurrence of birefringence in the resin sheet.

Still another object of the present invention is to provide a method of manufacturing an information recording medium substrate in which a pre-format pattern can be transferred onto a resin sheet with accuracy while occurrence of birefringence in the resin sheet is prevented.

According to one aspect of the present invention, there is provided a roll stamper for forming an information recording medium substrate, comprising a stamper member having a pattern corresponding to a pre-format for an information recording medium formed on its obverse surface, fixation members fixed to both end portions of a reverse surface of the stamper so as to be integral with the stamper member, and fit grooves capable of fittingly receiving the fixation members and formed on a circumferential surface of a specular roll base parallel to the axis of the specular roll base, the fixation members being fitted in the fit grooves, the stamper member being fixed along the circumferential surface of the specular roll base, and means for applying a tensile force to the stamper member.

According to another aspect of the present invention, there is provided an apparatus for continuously manufacturing an information recording medium substrate, comprising means for melting and extruding a resin to form a resin sheet, a roll stamper having a pattern corresponding to a pre-format formed on its surface, and a specular roll disposed so as to face the roll stamper, the roll stamper comprising a stamper member having a pattern corresponding to a pre-format pattern for an information recording medium, fixation members fixed to both end portions of a reverse surface of the stamper so as to be integral with the stamper member, fit grooves capable of fittingly receiving the fixation members and formed in a circumferential surface of a specular roll base parallel to the axis of the specular roll base, the fixation members being fitted in the fit grooves, the stamper member being fixed along the circumferential surface of the specular roll base, and means for applying a tensile force to the stamper member.

DESCRIPTION OF THE PREFERRED EMBODIMENTS

The present invention will be described below in detail with reference to the accompanying drawings.

Figure 1:
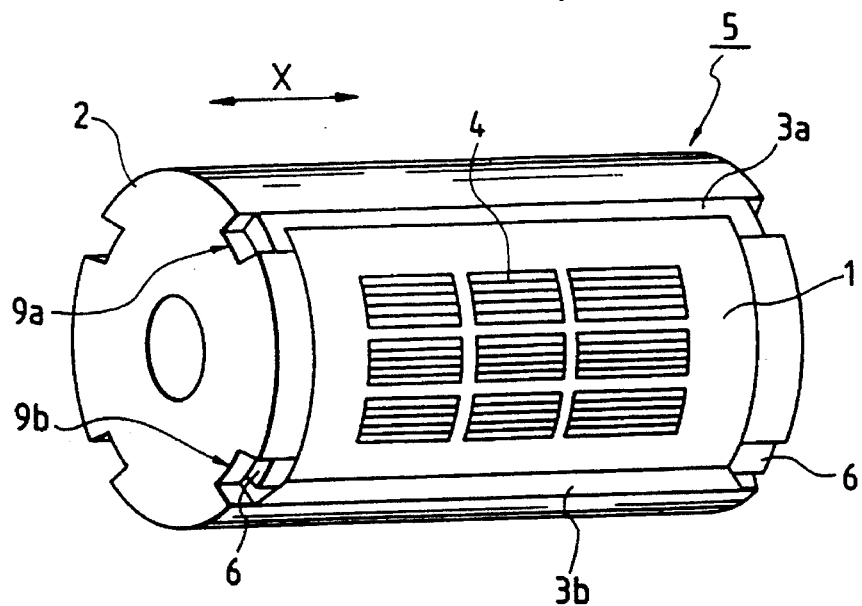
FIG. 1 is a perspective view of a roll stamper in accordance with a first embodiment of the present invention.
Figure 2:
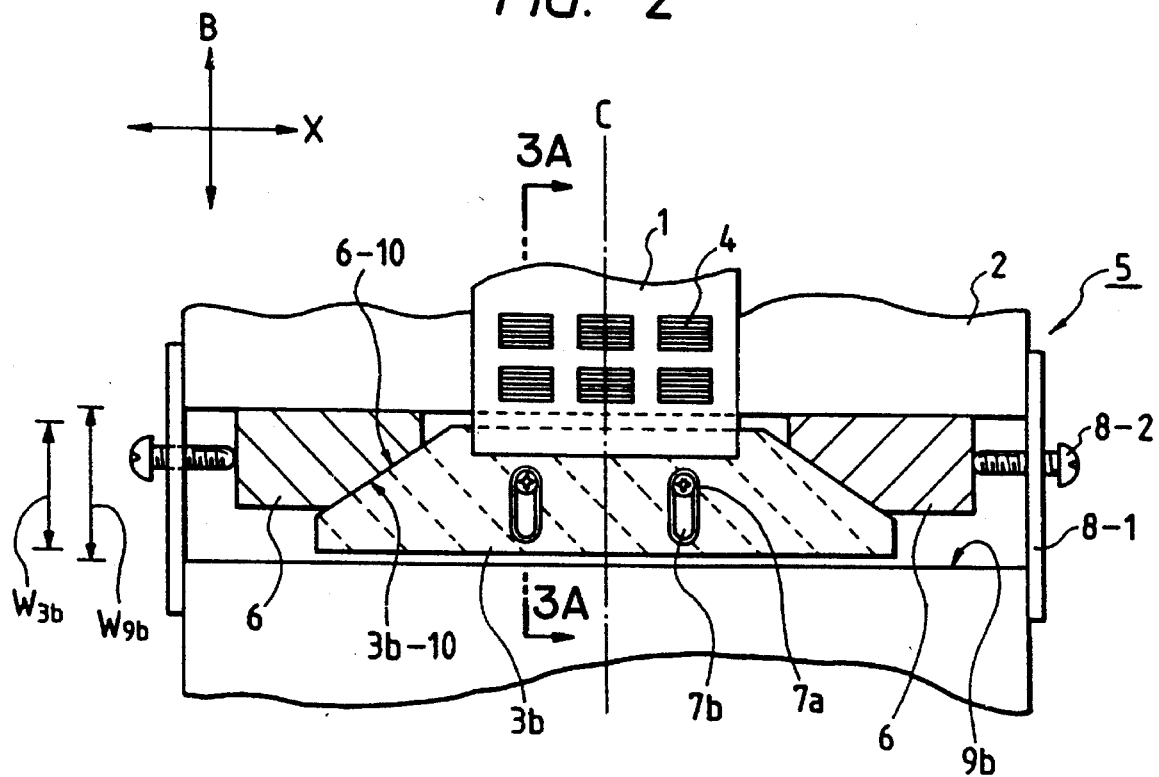
FIG. 2 is an enlarged plan view of a portion in the vicinity of a fixation member of the roll s tamper shown in FIG. 1.

FIG. 1 is a perspective view of a roll stamper 5 in accordance with an embodiment of the present invention. The roll stamper 5 is composed of a lengthwise flexible stamper 1 having an optical card pre-format pattern 4 formed on its surface, a specular roll base 2 on which the lengthwise flexible stamper 1 is fixed, stamper fixation members 3a and 3b for fixing the stamper 1 on the roll base 2, wedges 6 constituting a means for applying a tensile force to the stamper 1, and other members. In this embodiment, the tensile force application means is constituted of, as shown in FIG. 2, the wedges 6, and pressure application means 8 (fixing members 8-1 and pressing screws 8-2) for applying a pressing force to the wedges 6 in a direction toward a center axis line C of the roll stamper. FIG. 2 is an enlarged plan view of a portion of the roll stamper 5 in the vicinity of the stamper fixation member 3b shown in FIG. 1. (For simplification, the pressure application means 8 is omitted in FIG. 1.)

The tensile force application means of this embodiment will be described below in more detail with reference to FIG. 2.

The fixed members 8-1 are fixed on side surfaces of the roll base 2 so as to cover both ends of a fit groove 9b formed in the circumferential surface of the roll base 2. The pressing screws 8-2 are each screwed through the fixed members 8-1. The tip of each pressing screw 8-2 is formed so as to be capable of abutting against and pressing the wedge 6 as the pressing screw is advanced. The fixation member 3b has tapered surfaces 3b-10 which are brought into contact with tapered surfaces of the wedges 6 and which function to cause a force for tensing the stamper 1 from a pressure which is applied to the wedges 6 by the advancing movement of the pressing screws. Screws 7a are used to fix the fixation member 3b on the roll base 2.

Referring back to FIG. 1, the roll stamper 5 will be further described below. The stamper fixation members 3a and 3b extend along the widthwise direction (direction X) of the roll base 2 and are integrally fixed to both end portions of the reverse surface of the stamper 1. Fit grooves 9a and 9b in which the fixation members 3a and 3b can be fitted are formed on the circumferential surface of the specular roll base 2 so as to extend along the axis of the specular roll 2. The sectional configuration of the fit groove 9a is generally equal to the sectional configuration of the fixation member 3a. The fixation member 3a is fitted in the fit groove 9a to fix one end of the stamper 1 to the roll base 2 substantially firmly. The fit groove 9b is formed so as to have a width W9b greater than the width W3b of the fixation member 3b so that the fixation member 3b can move in the fit groove 9b when a tensile force is applied to the stamper 1 after the fixation member 3b has been fitted in the fit groove 9b by the above-described tensile force application means (6 and 8).

Figure 3:
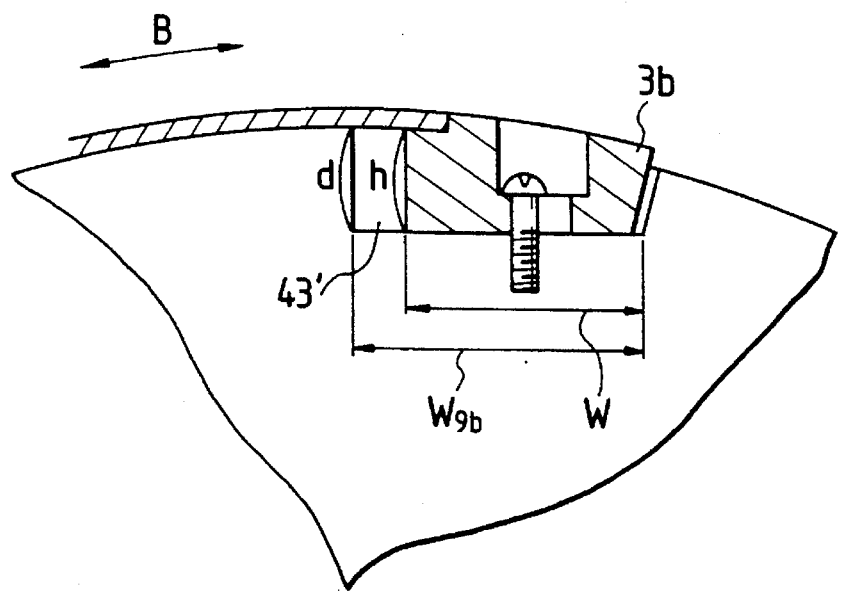
FIG. 3 is a cross-sectional view taken along the line 3A—3A of FIG. 2.

As shown in FIG. 2 and FIG. 3, which is taken along the line 3A—3A of FIG. 2, holes 7B which are formed in the fixation member 3b and through which the screws 7a for fixing the fixation member 3b to the roll base 2 are passed are elongated so that the fixation member 3b can move in the lengthwise direction of the stamper 1 (in the direction B shown in FIGS. 2 and 3) when the fixation member 3b is not completely fixed to the roll base 2. Hole 7B edges are chamferred so that the heads of the screws 7a may not protrude from the roll stamper surface.

The roll stamper 5 in accordance with this embodiment is assembled as described below. First, the fixation members 3a and 3b fixed to the reverse surface of the stamper 1 are each fitted in the fit grooves 9a and 9b of the specular roll base 2, and the fixation member 3b is temporarily fixed to the roll base 2 with the screws 7a to an extent such as to be able to move in the direction B.

Next, as shown in FIG. 2, the wedges 6 are placed so that its tapered surfaces 6-10 may come into contact with the tapered surfaces 3b-10 of the fixation member 3b, and its surfaces opposite to the tapered surfaces may come into contact with a wall surface of the fit groove 9b. The pressing screws 8-2 which are screwed into the fixing members 8-1 fixed on side surfaces of the roll base 2, so as to cover opposite ends of a fit groove 9b and abut against the wedges 6, are made to advance toward the center axis line C of the roll stamper 5. By this movement, a component of the pressing force applied to the wedges 6 acts as a force for tensing the stamper 1, and the stamper 1 is thereby brought into uniform and close contact with the circumferential surface of the roll base 2. The stamper 1 is thereby firmly fixed to the roll base 2 with the screws 7a. The roll stamper 5 is thus obtained.

According to the present invention, if the tensile force applied to the stamper 1 in the direction toward the bottom of FIG. 2 along the direction B is set to 5 to 40 kgf/mm$^2$, most perferably 5 to 20 kgf/mm$^2$, the stamper 1 can be brought into close contact with the circumferential surface of the roll base 2 without causing a strain in the stamper 1, and occurrence of a gap between the stamper 1 and the roll base 2 can be prevented when the stamper is used to form a resin sheet. It is thereby possible to obtain a roll stamper 5 which is capable of continuously transferring a pre-format pattern to a resin sheet with high accuracy, and improved durability.

In the roll stamper 5 in accordance with the above-described embodiment, as the material of the fixation member 3b having tapered surfaces 3b-10 contacting the wedges 6, a material having a Young's modulus of, preferably, $7.4 \times 10^3$ to $9 \times 10^4$ kgf/mm$^2$, and more preferably $1.8 \times 10^4$ to $4 \times 10^4$ kgf/mm$^2$, is selected to limit the bending of both end portions of the fixation member 3b caused by the force applied in the direction toward the bottom of FIG. 2 along the direction B as a component of the pressing force from the wedges 6. For example, stainless steel (SUS430), a copper alloy, carbon steel, cast iron, aluminum alloy, ceramics and the like may be used as this fixation member material. The cross-sectional area of the fixation member 3b is set to, preferably, 330 to 600 mm$^2$, and more preferably 80 to 250 mm$^2$, for the same reason, that is, to limit the bending of the mixing member 3.

The depth of the fit grooves 9a and 9b formed in the roll base 2 in accordance with the present invention varies according to the thickness of the roll base 2, but it is set to, preferably, 3 to 20 mm, and more preferably 5 to 10 mm$^2$, with respect to a hollow roll base having a thickness of 20 to 40 mm. That is, if the depth of the fit grooves is set within this range, there is no risk of a reduction in the strength of the roll base while suitable engagement between the roll base and the fixation member is ensured. Further, in this range, the change in the thermal capacity of the roll stamper 5 is limited to a comparatively small extent.

Figure 4A:
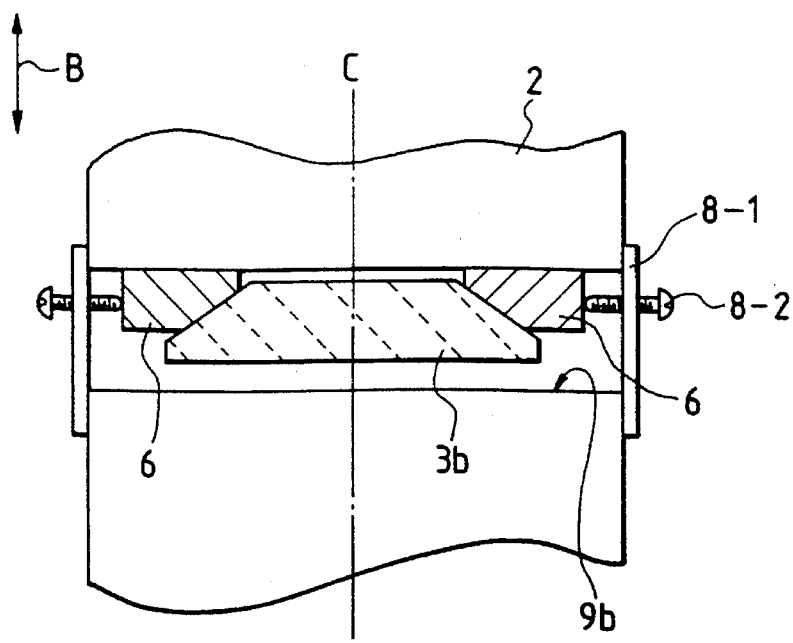
FIG. 4A is a diagram of an essential portion of the roll stamper shown in FIG. 1.
Figure 4B:
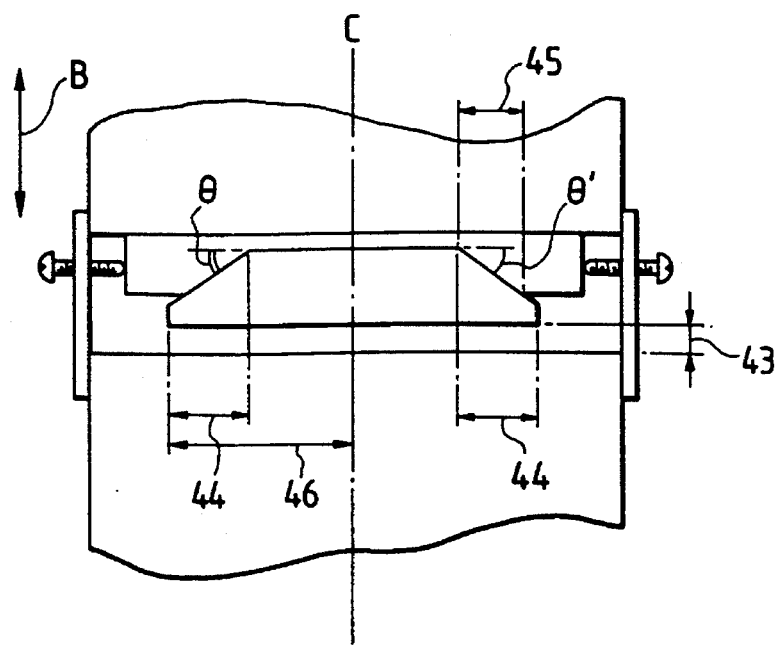
FIG. 4B is a diagram of the shapes of the fixation member and wedges of the roll stamper shown in FIG. 1.

On the basis of the cross-sectional area of the fixation member 3b and the depth of the fit grooves, the width W3b of the fixing groove 3b is set to, preferably, 10 to 30 mm, and more preferably, 16 to 25 mm. It is necessary to add at least a clearance 43 to the width of the fixing member 3b to determine the width W9b of the fit groove 9b in which the fixation member 3b is fitted, as shown in FIGS. 4A and 4B. The clearance 43 is required to enable the application of the tensile force from the wedges 6 to the stamper 1 in the direction toward the bottom of FIG. 4A or 4B along the direction B of the fixation member 3b. The clearance 43 may be set to 0.3 to 2 mm, and more preferably 0.5 to 1 mm, to ensure the application of the tensile force to the stamper 1 while limiting the formation of an unnecessary recess in the circumferential surface of the roll stamper 5. FIGS. 4A and 4B are schematic plan views of a portion of the roll stamper 5 in the vicinity of the fixation member 3b and the tensile force application means, FIG. 4A illustrating the related members, FIG. 4B showing the configurations of the members.

Figure 5:
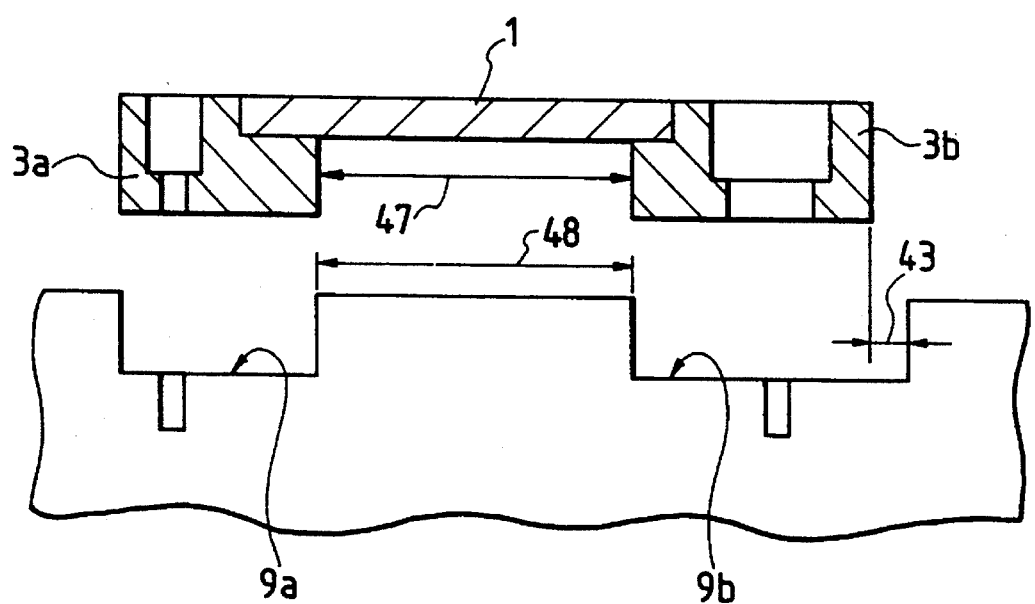
FIG. 5 is an exploded sectional view of the roll stamper shown in FIG. 1.

According to the present invention, if, as shown in FIG. 5, which is an exploded view of the stamper 2 to which the fixation members 3a and 3b are fixed and the roll base 2 in which grooves 9a and 9b are formed, the distance 47 between the fixation members 3a and 3b is substantially equal to the distance 48 between the fit grooves 9a and 9b, only a gap corresponding to the clearance 43' exists along the outer-end surface of the stamper 1 facing in the direction of application of the tensile force, as shown in FIG. 3, so that thermal capacity variations occurring in the roll stamper can be controlled in a small range.

The shapes of the fixation member 3b and the wedges 6 in accordance with the present invention will be described below. As described above, the fixation member 3b has tapered surfaces 3b-10 formed on both its end portions for abutment against the tapered surfaces 6-10 of the wedges 6. The angle θ between each tapered portion of the fixation member 3b and a line parallel to the longitudinal axis of the fixing member 3b (direction X) (see FIG. 4B) is set to, preferably, 8° to 45°, and more preferably 10° to 40°, to efficiently produce the tensile force of the stamper 1 from the pressing force from the wedges 6 while avoiding concentration of the tensile force to end portions of the fixation member 3b alone.

The angle θ' of the tapered surface 6-10 of each wedge 6 is set to be substantially equal to θ, so that the tapered portions 3b-10 of the fixation member 3b and the tapered surfaces of the wedges 6 abut uniformly on each other. $\theta' = \theta_{-1.5°}^{+0°}$ is regarded as substantially equal to θ. If the wedges 6 and the fixation member 3b are formed so that the tapered surface of each wedge 6, whose tapered portion 6-10 has a length 45, can always come into contact with ¼ or greater, and more preferably ⅓ or greater of the tapered surface area of the fixation member 3b, there is no risk of a considerable concentration of tensile force to a particular portion of the fixation member 3b and, hence, no risk of occurrence of considerable strain in the fixation member 3b.

Also, the arrangement may be such that a proportion of the length 44 of the tapered portion of the fixation member 3b shown in FIG. 4B to ½ of the length of the fixation member 3b (length 46) is ⅓ or greater, and more preferably ½ or greater, and such that the tip of each wedge 6 can be inserted toward the center axis line C of the fixation member 3b by ⅙ or greater, and more preferably ¼ or greater from the left or right end of the fixation member 3b, while the wedges 6 are formed so that at least ¼, and more preferably, at least ⅓ of each tapered surface 3b-10 of the fixation member 3b may be brought into contact with the tapered surface 6-10 of the wedge 6 as described above. It is thereby possible to uniformly apply the force to the fixation member 3b in the direction toward the bottom of FIG. 4A or 4B to prevent deflection of the fixation member 3b. Consequently, it is possible to prevent the stamper 1 from floating from the roll base 2 in the vicinity of the center axis line C of the stamper 1 (and in the vicinity of the fixation member 3b in particular).

The material of the wedges, 6 in accordance with the present invention may be the same as the above-described material of the fixation member 3b.

Figure 6A:
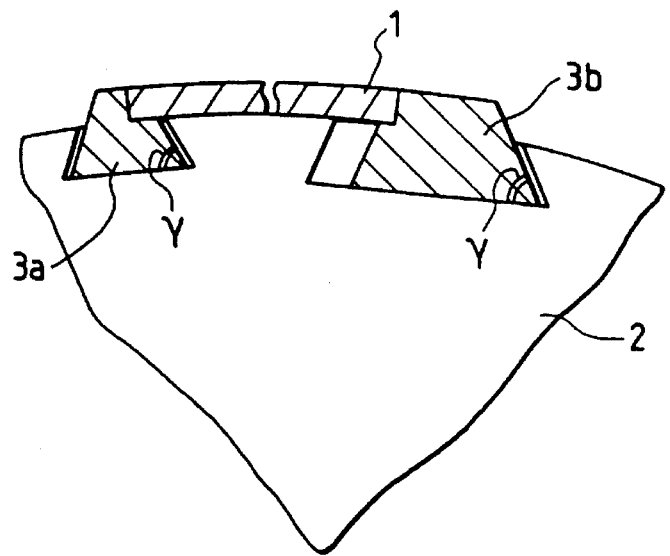
FIG. 6A is a schematic cross-sectional view of a roll stamper in accordance with a second embodiment of the present invention.

In the second embodiment of the present invention, the fit groove 9a formed in the roll base 2 and the fixation member 3a fitted in the fit groove 9a have cross-sectional shapes such as to be engageable with each other, e.g., trapezoidal shapes as shown in FIG. 6A. By this arrangement, the fixation member 3a can be prevented from floating and coming off the fit groove 9a by the application of the tensile force from the tensile force application means to the stamper, even if the fixation member 3a and the roll base 2 are not fixed to each other with screws.

With respect to the cross-sectional shapes of the fit groove 9b and the fixation member 3b as well, right end portions of the fixation member 3b and the fit groove 9b are formed by being tapered in the direction of their height (depth), as shown in FIG. 6A, thereby effectively preventing the fixing groove 3b from coming off the fit groove 9b without using screws when the stamper is tensed.

By this arrangement, the need for fixing the fixation member to the roll base with screws is eliminated, to enable the stamper 1 to move in the axial direction of the roll base 2, thereby making it easy to effect a centering adjustment, e.g., to make the center axis of the stamper 1 coincide with that of a molten resin sheet to be formed.

Figure 8:
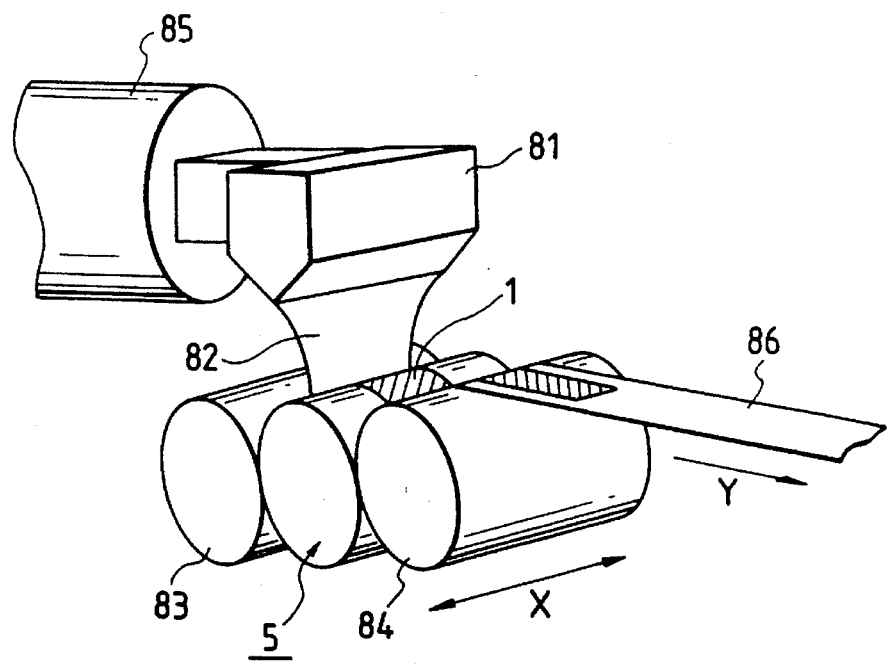
FIG. 8 is a schematic diagram of an apparatus for manufacturing an information recording medium substrate in accordance with the present invention.
Figure 9:
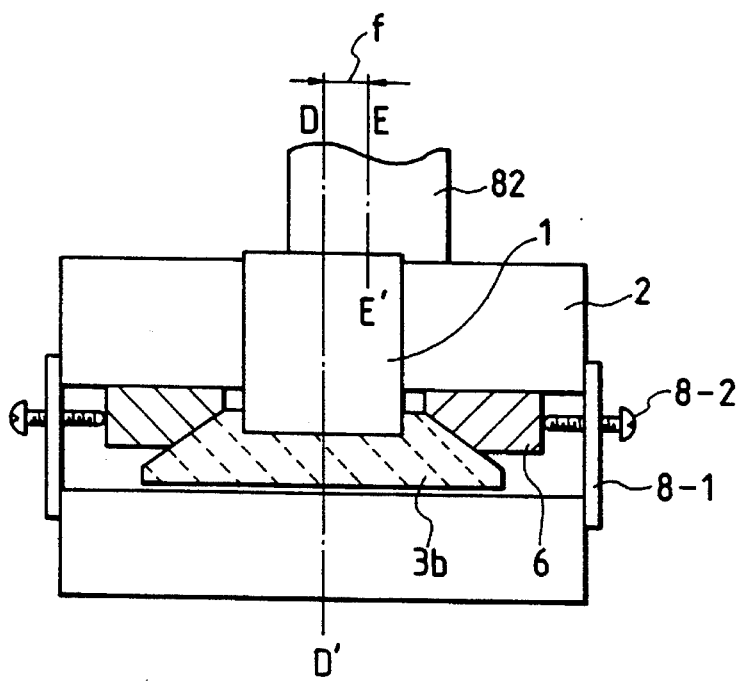
FIG. 9 is a diagram of a centering adjustment of a molten resin sheet and the roll stamper.

FIG. 8 is a schematic perspective view of a molding machine having a roll stamper for forming an optical recording medium in accordance with this embodiment, and FIG. 9 is a diagram of an eccentric state of a molten resin sheet and the roll stamper in the apparatus shown in FIG. 8.

As shown in FIG. 8, a molten resin sheet 82 extruded from a T die 81 of an extruder 85 enters, in a molten or soft state, the gap between a specular roll 83 and a roll stamper 5, is then pressed and cooled, and is drawn in the direction of arrow Y out of the gap between the roll stamper 5 and the specular roll 84. Simultaneously, a pre-format pattern 4 formed in the surface of the flexible stamper 1 is accurately transferred to the molten resin sheet 82. If at this time an error in the positioning of the roll stamper 5 occurs, such that the center line DD' of the flexible stamper 1 does not coincide with the center line EE' of the molten resin sheet 82, and has an eccentricity f from the same, as shown in FIG. 9, it is preferable to effect a centering adjustment by making the center lines DD' and EE' coincide with each other.

In this embodiment, as shown in FIG. 9, the pressing screw at the end of the stamper in the direction opposite to the direction of the eccentricity f, i.e., the right pressing screw 8-2 is unscrewed to an extent corresponding to the eccentricity. The left pressing screw 8-2 is thereafter advanced to an extent corresponding to the eccentricity f to finely move the fixation member 3b in the direction opposite to the direction of the eccentricity, i.e., the direction of arrow Z to an extent corresponding to the eccentricity f, and to simultaneously slide the other fixation member 3a to the same extent. Thus, a centering adjustment can easily be effected.

Figure 6B:
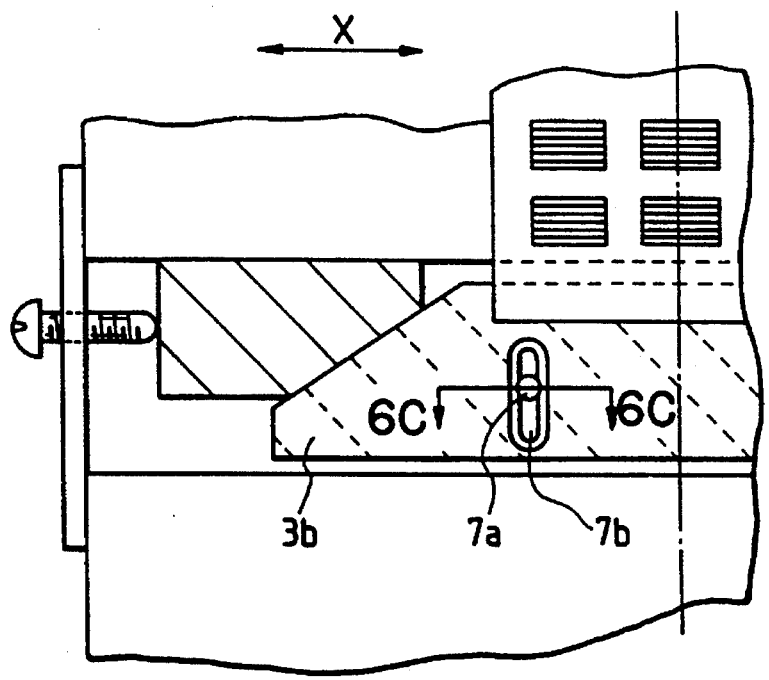
FIG. 6B is a schematic plan view of the roll stamper shown in FIG. 6A.
Figure 6C:
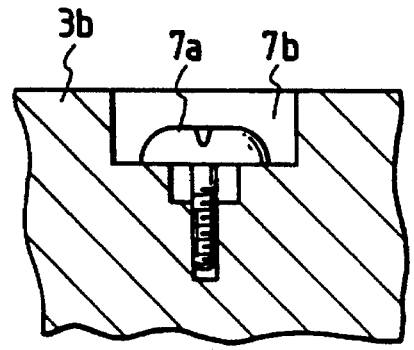
FIG. 6C is a cross-sectional view taken along the line 6C—6C of FIG. 6B.

If the screws 7a and the holes 7b for fixing the fixation member 3b to the roll base 2 are formed, as shown in FIG. 6B and FIG. 6C which is a cross-sectional view taken along the line 6C—6C of FIG. 6B, so that the fixation member 3b is movable in the widthwise direction of the roll base 2 (the direction of arrows X) in a state of being not completely fixed to the roll base 2, a centering adjustment can easily be effected even in the case of an arrangement using screws 7a.

Figure 7A:
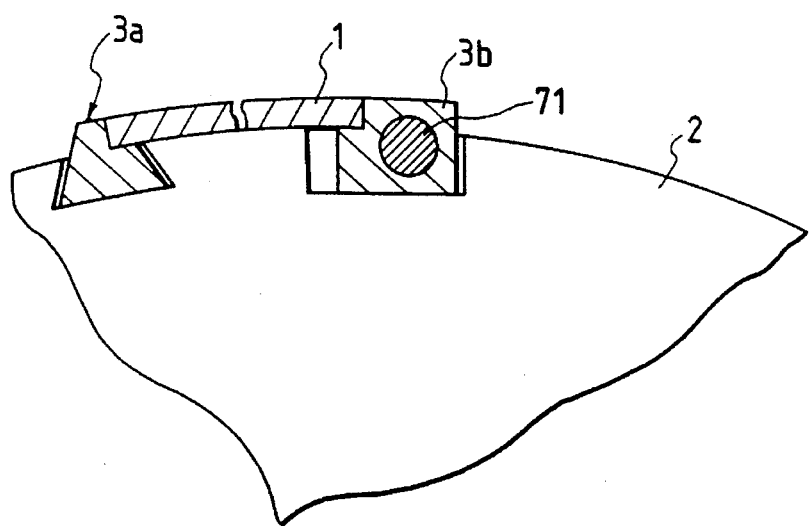
FIG. 7A is a schematic cross-sectional view of a roll stamper in accordance with a third embodiment of the present invention.

The arrangement may also be such that in accordance with the third embodiment of the present invention a hollow member in which a magnet rod 71 is inserted is welded as a stamper fixation member 3b to the stamper 1, as shown in FIG. 7A. If such a stamper fixation member is used, it is possible to prevent the fixation member 3b from coming off the fit groove 9b without using screws 7 when the stamper is tensed.

Figure 7B:
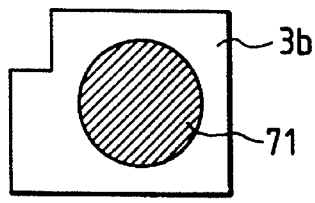
FIG. 7B is a diagram of an example of an inner cavity of the fixation member.
Figure 7C:
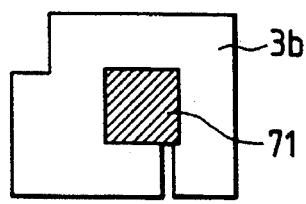
FIG. 7C is a diagram of another example of the inner cavity of the fixation member.
Figure 7D:
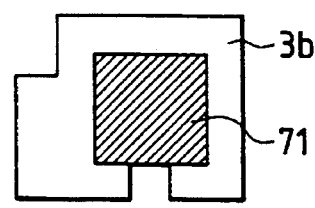
FIG. 7D is a diagram of still another example of the inner cavity of the fixation member.

The cavity in the hollow member can be formed by drilling, electrical discharge machining, plate bending or the like. The magnet rod may be formed of a material such as $SmCo_5$, $Nd_2Fe_{14}B$, $Sm(Co, Fe, Cu)_{6.8}$ or $Sm(Co, Fe, Cu, Zr)_{7.4}$, or an Nd—Fe—B magnet. The cavity of the hollow member and the magnet rod may have a shape selected from those shown in FIGS. 7B to 7D, but is not limited to these shapes.

A centering adjustment can also be effected easily in this embodiment.

Figure 10A:
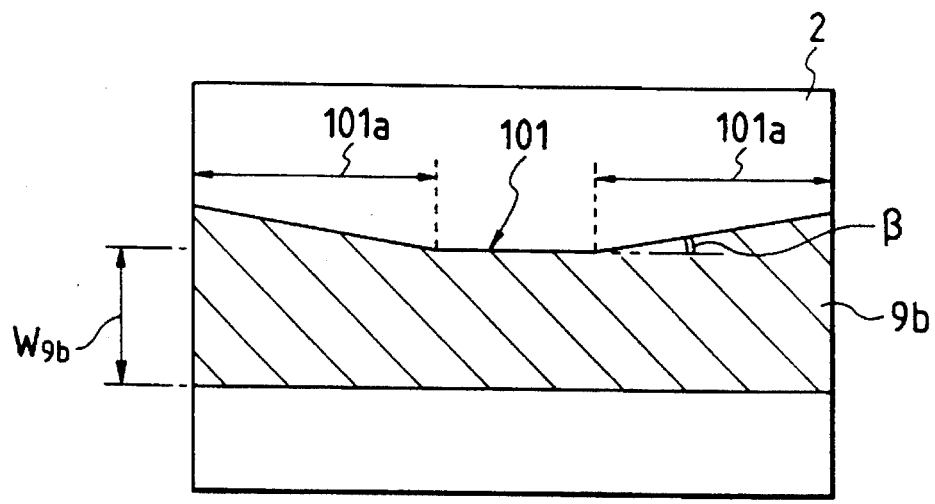
FIG. 10A is a schematic plan view of a roll base for use in a roll stamper in accordance with a fourth embodiment of the present invention.
Figure 10B:
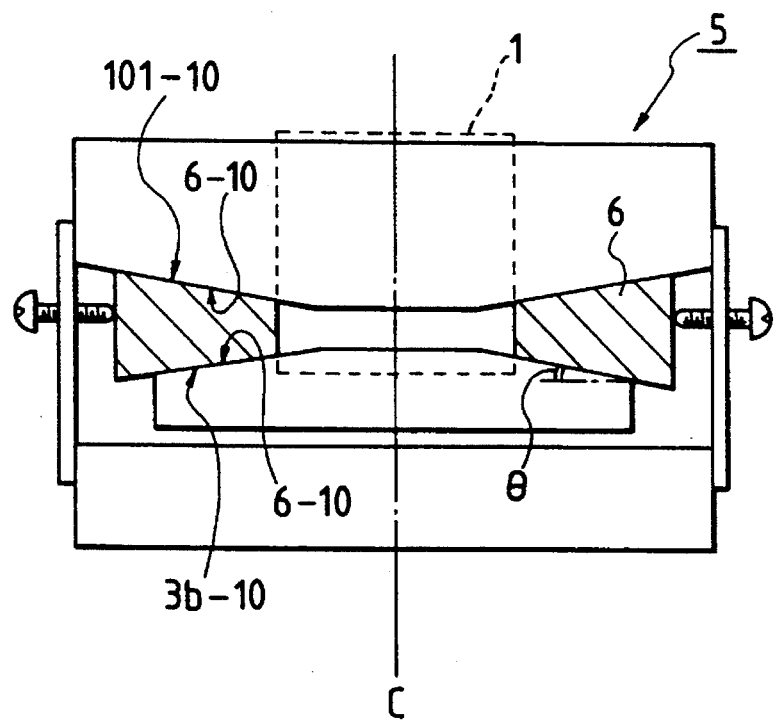
FIG. 10B is a schematic plan view of the roll stamper using the roll base shown in FIG. 10A in accordance with the fourth embodiment.

The fourth embodiment of the present invention will be described below with reference to FIGS. 10A and 10B. FIG. 10A is a schematic plan view of a roll base 2 in which a fit groove 9b is formed, and FIG. 10B is a diagram of a roll stamper 5 manufactured by using this roll base.

In this embodiment, both end portions of a side 101 of the fit groove 9b facing the direction in which the flexible stamper is tensed are formed as tapered portions 101a, while wedges 106 worked to have opposite tapered surfaces such as to be capable of abutting on both the tapered surfaces 3b-10 of a fixation member 3b and the surfaces of the tapered portions 101a of the fit groove 9b are prepared. These wedges 106 are disposed between the fixation member 3b and the side 101 of the fit groove 9b and are pressed with pressing screws 8-2 to apply a tensile force to the stamper 1.

In this embodiment, the angle β of the tapered portions 101a formed on the side 101 of the fit groove 9b is preferably 8° to 45°, and more preferably 10° to 40°, and the angle θ of the tapered surfaces 3b-10 of the fixation member 3b is preferably 8° to 45°, and more preferably 10° to 40°. The angles β and θ may be equal or different.

The proportion of the length of the tapered portions 101a to half the length of the fixation member 3b (length 46) is set to preferably ⅓ or greater, and more preferably ½ or greater, as in the case of the first embodiment.

Further, the arrangement may be such that the tip of each wedge 6 may be inserted toward the center axis line C of the fixation member 3b by ⅙ or greater, and more specifically ¼ or greater from the left or right end of the fixation member 3b, while the wedges 6 are formed so that at least ¼, and more preferably at least ⅓ of each tapered surface 3b-10 of the fixation member 3b and each of tapered surfaces 101-10 of the side 101 of the fit groove 9b may be brought into contact with the tapered surface 6-10 of the wedge 6 as described above. It is thereby possible to uniformly apply a force to the fixation member 3b in the direction toward the bottom of FIG. 4A or 4B to prevent deflection of the fixation member 3b. Consequently, it is possible to prevent the stamper 1 from floating from the roll base 2 in the vicinity of the center axis line C of the stamper 1 (and in the vicinity of the fixation member 3b in particular).

Figure 11A:
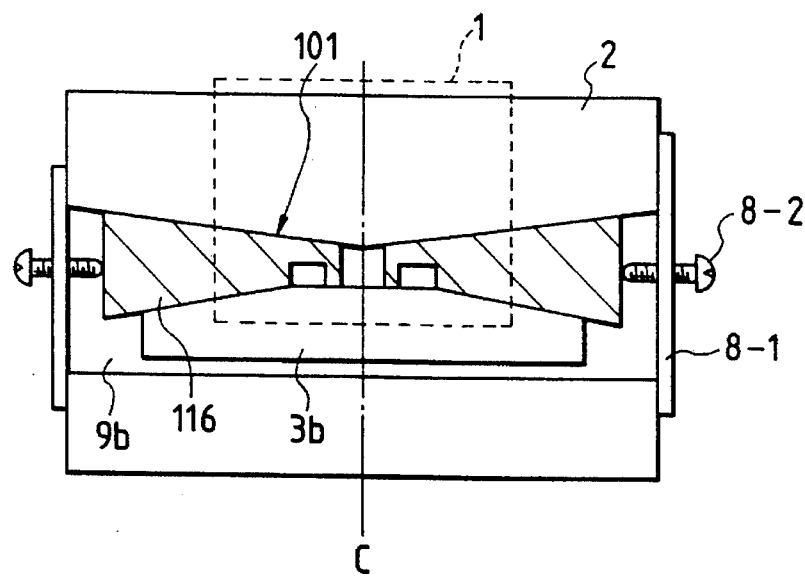
FIG. 11A is a schematic plan view of a roll stamper in accordance with a fifth embodiment of the present invention.

FIG. 11A shows the fifth embodiment of the present invention which is characterized in that each of wedges 116 shown in FIG. 11A has a projection 111a at its tip and a notch 111b formed at the rear end of the projection 111a.

Figure 11B:
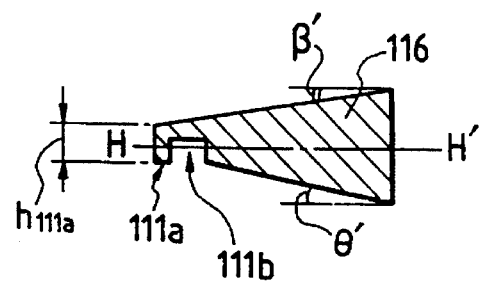
FIG. 11B is a plan view of the wedge for use in the roll stamper shown in FIG. 11A.

Preferably, the height h111a of the wedge projection 111a shown in FIG. 11B is formed so that the projection 111a may be located in the vicinity of the fixation member 3b when the wedges 116 are placed between fixation member 3b and the side 101 of the fit groove 9b without application of tensile force. "The vicinity of the center of the fixation member 3b" through out the present description means a section defined between left and right ends of the fixation member 3b, having a distance of ⅙ or more, and more preferably ¼ or more of the entire length of the fixation member 3b from each end toward the axial line C.

By the effect of the notch 111b formed at the rear end of each projection 111a as shown in FIG. 11B, the projection 111a can accurately be brought into contact with the fixation member 3b in the vicinity of the center thereof to prevent the fixation member 3b from deflecting.

Figure 15:
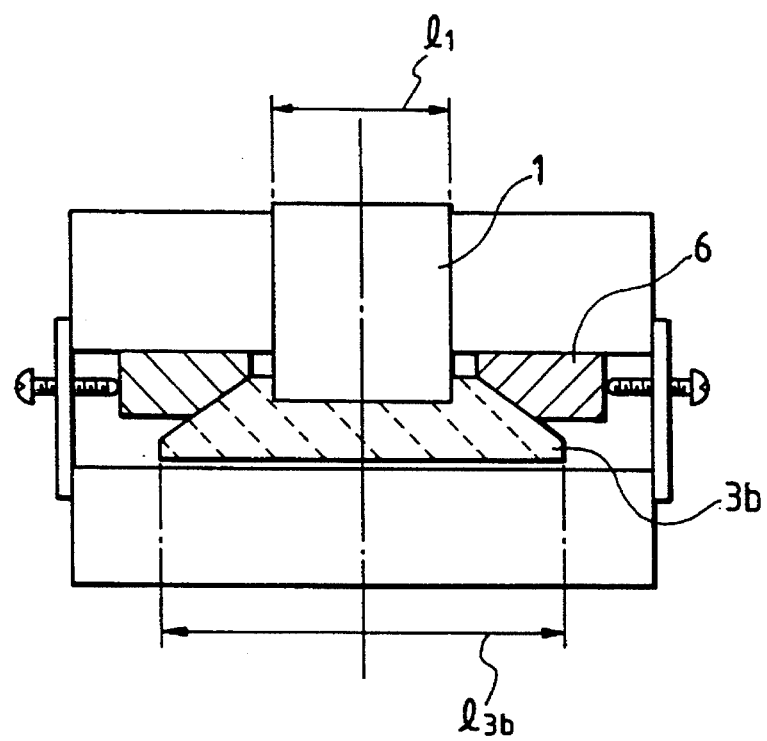
FIG. 15 is a diagram of the relationship between the widths of the fixation member and the stamper.

In accordance with the present invention, the relationship between the length $l_{3b}$ of the fixation member 3b and the width $l_1$ of the stamper shown in FIG. 15 is selected so that $l_1 l_{3b}$ is preferably 0.65 or smaller, and more preferably 0.59 or smaller, in terms of the adhesion of the stamper 1 to the roll base.

Further, the arrangement may be such that the tip of each wedge 6 is not brought to a position under the stamper 1 in the state of application of tensile force. In this case, even if the tip of each wedge is floated by the application of a pressing force to the wedge, the tip of the wedge does not interfere with the stamper 1 and there is no possibility of any bad influence upon the formation of a resin sheet.

Figure 11C:
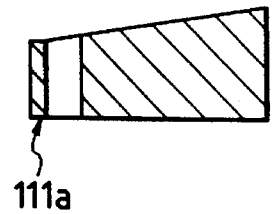
FIG. 11C is a cross-sectional view of the wedge taken along the line 11C—11C of FIG. 11B.

In the case of a construction in which each wedge 6 can move to a position under the stamper 1, the wedges 6 of the type shown in FIG. 11B are formed so as to have a cross-sectional shape, for example, such as to be reduced in thickness toward the projection 111a at the tip, as shown in FIG. 11C, thereby avoiding interference between the tip of each wedge 6 and the stamper 1.

Figure 12:
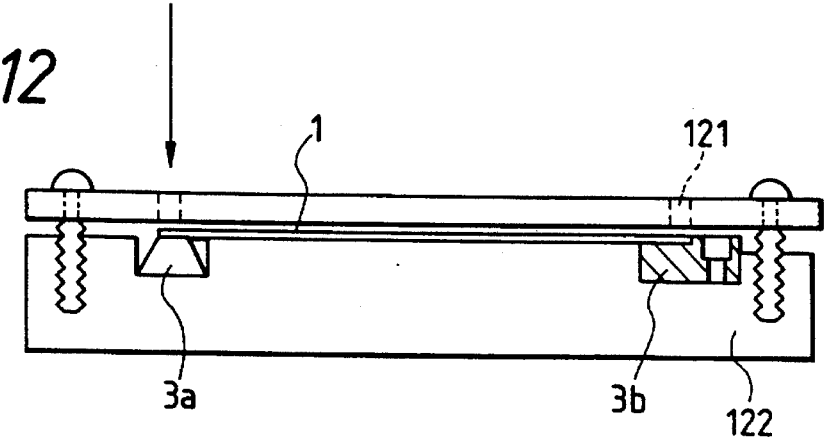
FIG. 12 is a diagram of a method of welding the flexible stamper and the fixation member.

Any method can be used as a method of fixing the fixation members 3a and 3b formed integrally with the stamper 1 so long as there is no possibility of the stamper 1 and the fixation members 3a and 3b separating from each other at the time of attachment of the stamper 1 to the roll base 2 and during and after resin sheet molding. However, electron beam welding, silver soldering, laser welding or the like is preferred if the strength of adhesion between the stamper and the fixation members and the evenness of the surface of the stamper are considered. For example, in a fixing process based on electron beam welding or laser welding, fixation members 3a and 3b are placed in predetermined positions on a welding jig 122 having beam slits 121 as shown in FIG. 12, and a surface to be welded of lengthwise flexible stamper 1 (a surface opposite to another surface in which a pre-format pattern including tracking grooves and information pits is formed) and surfaces to be welded of fixation members 3a and 3b are brought into abutment on each other. An upper cover 123 is then placed on these members and fixed with screws, thereby completing setting. The stamper 1 is thereafter irradiated with an electron beam or a laser beam (e.g., YAG laser beam) through the slits 121, thereby fixing the fixation members to the stamper 1.

If the welding using an electron beam or a laser beam is performed by emitting pulses of the beams (having a frequency of, e.g., 60 Hz and a duty ratio of about 20 to 50%), occurrence of strains in the flexible stamper can be markedly limited.

In a process of fixing the stamper fixation members by silver soldering, a silver solder foil is placed between a surface to be welded of lengthwise flexible stamper 1 and surfaces to be welded of stamper fixation members 3a and 3b, and the surfaces to be welded are brought into abutment on each other. Stamper 1 and fixation members 3a and 3b are then pressed at a pressure of 20 to 50 kg/cm² so as to come into close contact with each other. These members are then heated in a vacuum heating furnace under the following conditions: a vacuum of $2 \times 10^{-5}$ Torr, a peak heating temperature of 820° C., a and heating time of 7 hours to effect silver solder welding, thereby fixing the stamper fixation members to the lengthwise flexible stamper.

Welding positioning can be effected with improved accuracy by performing welding after setting the stamper fixation members 3a and 3b in the grooves of the roll base 2.

FIGS. 13A, 13B, 13C and 14 show the sixth embodiment of the present invention in which a different tensile force application means is used.

Figure 13A:
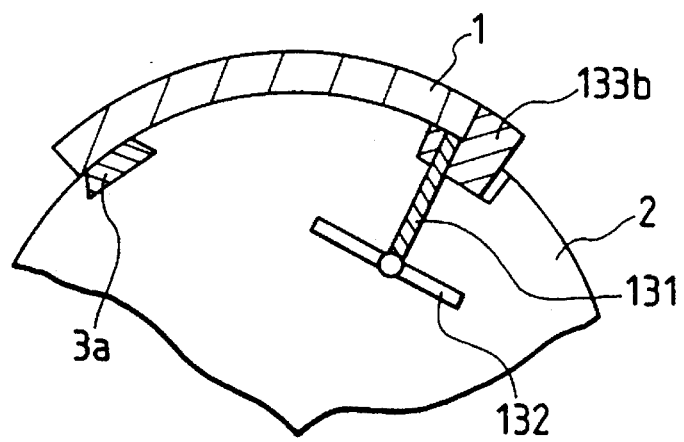
FIG. 13A is a schematic cross-sectional view of a state before a tensile force is applied to the stamper.
Figure 13B:
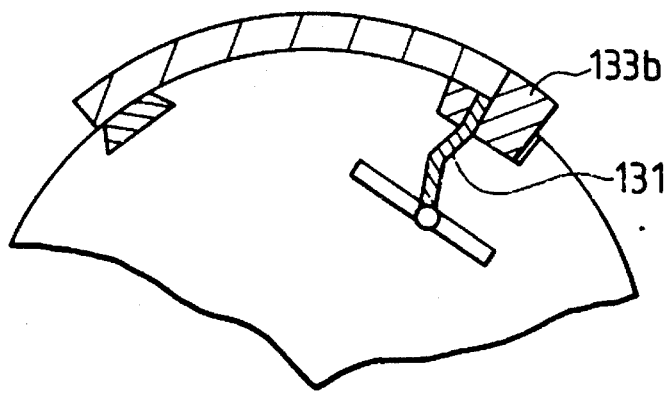
FIG. 13B is a schematic cross-sectional view of a state after the tensile force has been applied to the stamper.
Figure 13C:
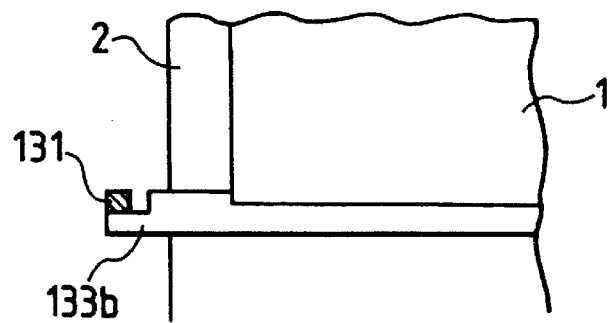
FIG. 13C is a schematic plan view of the roll stamper shown in FIG. 13A.

As shown in FIG. 13A, a tension rod 131 is engaged at its one end with a fixation member 133b fixed to one end of the stamper 1 and is connected at the other end to a side portion of a roll base 2. The tension rod 131 is formed of a shape memory alloy whose predetermined shaped is restored when the temperature of the roll stamper is increased to a set temperature during resin molding, a bimetal which deforms at a set temperature, or the like. As the tension rod 131 is restored or deformed into a shape such as shown in FIG. 13B at the set temperature, a tensile force is applied to the stamper 1.

Au—Cd alloy, Cu—Al—Zn alloy, Cu—Al—Ni alloy, In—Tl alloy, Ni—Al alloy, Ni—Ti alloy and the like are known as ordinary shape memory alloys, and any material can be used as the material of the tension rod 131 so long as it is capable of restoring the shape at a temperature close to the set temperature of the roll stamper. Specifically, a Ni—Ti alloy is preferred in terms of life during repeated use.

Also, a bimetal consisting of a combination of brass (30 to 40% Zn) and nickel steel (34% Ni), brass (30 to 40% Zn) and invar (36% Ni), Monel metal (Ni—Cu) and nickel steel (34 to 42% Ni), or the like can be used.

The side portion to which the other end of the tension rod is fixed may be formed so that the tension rod can slide, as indicated at 132 in FIG. 13A, thereby making it possible to accurately control the tensile force applied to the stamper 1.

Figure 14:
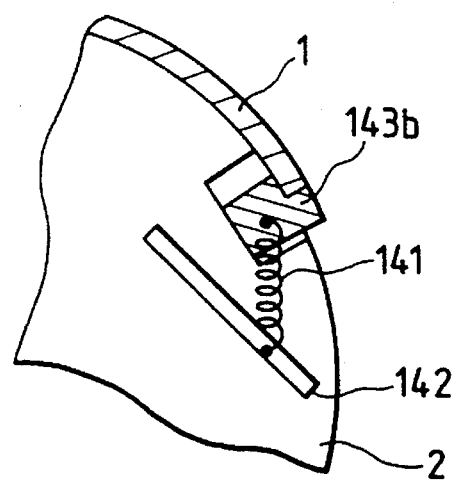
FIG. 14 is a schematic cross-sectional view of a roll stamper in accordance with a seventh embodiment of the present invention.

FIG. 14 shows the seventh embodiment of the present invention in which a spring 141 is used as a means for applying a tensile force to the stamper 1. One end of the spring 141 is fixed to a fixation member 143b fixed to the stamper 1, while the other end of the spring 141 is fixed to a side portion of the roll base 2. A sliding portion 142 is formed as the spring fixation side portion of the roll base 2 so that the other end of the spring 141 can slide. It is possible to control the tensile force applied to the stamper 1 by changing the position at which the other end of the spring is fixed. This embodiment, in which a spring is used as a tensile force application means, is advantageous because even if an overload is imposed upon the stamper 1, for example, by adhesion of the molten resin during molding, the resiliency of the spring prevents the stamper 1 from being easily damaged.

The arrangement of the present invention may alternatively be such that fixation members 3b, 133b or 143b are fixed to both end portions of the reverse surface of the flexible stamper 1, and tensile force application means are disposed in association with these two fixation members 3b to pull the two ends of the flexible stamper 1 in opposite directions. In this case, the two tensile force application means may be the same or different.

The flexible stamper 1 in accordance with the present invention is manufactured by an known process, e.g., an electroforming process. The thickness of the stamper 1 is set to, preferably, a value in the range of 20 to 500 μm in consideration of sufficient never and inhibition of increase in the diameter of the roll stamper.

Information recording pre-format pattern 4 to be formed in the stamper in accordance with the present invention is, for example, a pattern corresponding to a spiral groove, concentric-circle grooves or parallel grooves for optical disks or optical cards having a width of 1.5 to 2 μm, a pitch of 1.0 to 5 μm and a depth of about 200 to 5,000 Å, or a pattern corresponding to a spiral groove, concentric-circle grooves or parallel grooves for optical disks or optical cards having a width of 2 to 5 μm, a pitch of 8 to 15 μm and a depth of about 200 to 5,000 Å.

Preferably, the reverse surface of the s tamper, more specifically, a portion of the reverse surface corresponding to an obverse surface region in which pre-format pattern 4 is formed, is polished so as to be specular, i.e., to have a surface roughness of 0.1 μm or lower.

Preferably, the circumferential surface of the roll base 2 used in accordance with the present invention is polished to have a surface roughness of 0.1 μm or lower. As the material of the roll base 2, a material which can be polished to form a specular surface, e.g., carbon steel, Al, a sintered hard metal, or die steel (such as marageing steel), is preferred. Specifically, chromium steel which can easily be posished to form a specular surface is preferably used.

The roll base 2 may have an inner cavity through which a heating medium for heating the roll stamper, e.g., oil or the like, can be circulated. In this case, the thickness of the roll base 2 is preferably in the range of 10 to 15 cm if the strength of the roll stamper and the limiting of the diameter of the roll stamper are considered.

Fit grooves 9a and 9b can be formed in the roll base 2 by electrical discharge machining, bite machining, dressing or the like.

A process of continuously manufacturing an information recording medium substrate using the roll stamper illustrated in FIG. 1 will now be described below with reference to FIG. 8.

First, resin pellets thrown into an extruder 85 are heated and melted in a barrel of extruder 85, pressurized by a screw, and formed into a sheet-like shape by T-die 81.

The temperature of the resin in this step is, for example, 260° to 330° C., and more preferably 280° to 320° C. in the case of a polycarbonate resin. A transparent resin sheet 82 in a substantially molten state is thereby extruded continuously from the T-die. The T-die is positioned so that the molten resin sheet is extruded into between specular roll 83 and roll stamper 5.

Then the molten resin sheet is pinched between roll stamper 5 and specular roll 83 and between roll stamper 5 and specular roll 84 to transfer pre-format pattern 4 on the surface of the flexible stamper 1, thereby forming an information recording medium substrate sheet 86.

At this time, the roll stamper 5 in accordance with the present invention is maintained at a temperature such that the molten resin sheet is not solidified on the roll stamper. That is, it is preferable to heat the roll stamper up to the range of +20° to –20° C., about the thermal deformation temperature of the resin. For example, if a polycarbonate resin is used, it is preferable to heat the surface temperature of the roll stamper to the range of 100° to 160° C. That is, in this temperature range, the molten resin sheet is not abruptly cooled, so that strain due to shrinkage or the like is not easily caused in the resin sheet. It is also preferable to set the temperature of the specular rolls 83 and 84 facing the roll stamper 5 to the same temperature as that of the roll stamper 5 or a slightly lower temperature.

The temperatures of these rolls are controlled, for example, by electrical heating through a cast heater in the rolls or by circulating a heating medium through central portions of the rolls.

According to the present invention, as described above, a roll stamper having improved durability can be obtained in which the flexible stamper is not separated from the roll base even during the process of continuously transferring a pre-format pattern to a resin sheet.

According to the present invention, the flexible stamper can be fixed with improved adhesion on the circumferential surface of the roll base so that occurrence of a gap between the flexible stamper and the roll base is inhibited. Consequently, during the process of forming a resin sheet, the heat conducted to the flexible stamper can be rapidly transmitted to the roll base so that the temperature of the whole surface of the flexible stamper on the roll base is uniform. It is thereby possible to obtain, with improved productivity, a high-quality information recording medium substrate improved in pre-format transfer performance, and free of transfer failure and birefringence.

EXAMPLES

The present invention will be described below in more detail with respect to examples thereof.

Example 1

Figure 16A:
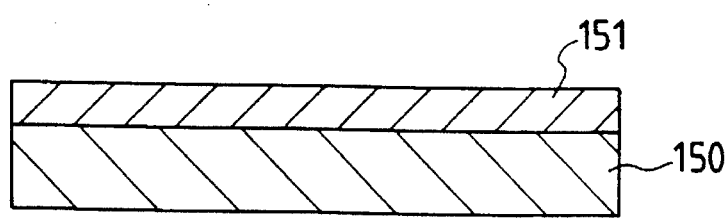
FIG. 16A to 16E are diagrams of the steps of a process for manufacturing the stamper.

A flexible stamper 1 was manufactured by a process described below. First, a surface of a blue plate glass having a length of 34 cm, a width of 30 cm and a thickness of 10 mm was polished to be specular, and a 3,000 Å photoresist layer of a photoresist (commercial name: AZ-1370, a product from Nippon Hoechst Co., Ltd.) was formed on the polished surface and was pre-baked at 90° C. for 30 minutes (FIG. 16A).

Figure 16B:
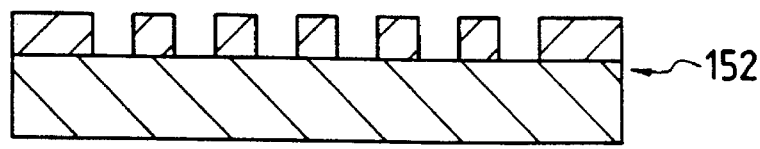

Next, a resist pattern was formed by exposure of a pre-format pattern for an optical card with a laser exposure apparatus and a developer liquid (commercial name: AZ312MIF, a product from Nippon Hoechst Co., Ltd.), thereby forming an glass original plate 152 for forming optical cards (FIG. 16B).

The pre-format pattern has a pattern corresponding to optical card grooves formed in an area of 80×30 mm and having a width of 2.5 μm, a pitch of 9.5 μm, and a depth of 2,500–3,000 Å. The same pre-format patterns corresponding to 9 optical cards were formed on one glass original plate.

Figure 16C:
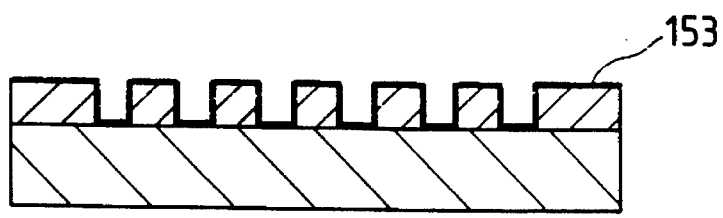

In a pretreatment before forming a metallic film by electroforming, a nickel film having a thickness of 1,000 to 2,000 Å was formed by a sputtering apparatus as an electroconductive layer 153 on the glass original plate 152 (FIG. 16C).

Figure 16D:
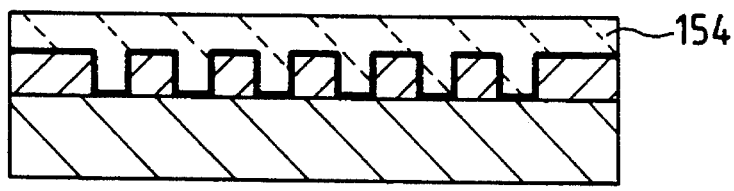

Thereafter, a metallic film 154 of nickel having a thickness of 250 μm was formed by electroforming on the electroconductive film 153 formed on the glass original plate 152 (FIG. 16D).

Figure 16E:

Finally, the electroconductive layer 153 and the metallic film 154 were separated as one united member from the glass original plate 152 and the photoresist attached to the obverse surface was removed. Then the reverse surface was worked by trimming and was polished to form a specular surface having a surface roughness of 0.1 μm, thereby manufacturing a lengthwise flexible stamper 1 such as shown in FIG. 1 having 9 optical card pre-format patterns on the obverse surface and having a length of 293 mm, a width of 150 mm and a thickness of 200 μm (FIG. 16E). Fixation members 3a and 3b were fixed to respective end portions of the reverse surface of the thus-obtained stamper 1. Fixation member 3a was of stainless steel having a length of 310 mm, a width of 13 mm and a height of 10 mm. Fixation member 3b was a member which had a cross-sectional shape such as shown in FIG. 3 having a height (h) of 10 mm and a width (W) of 18.5 mm, and a shape as viewed in plan (see FIG. 5), in which a length was 310 mm the angle θ of tapered portions 3b-10 was 13.5° and the length 44 of the tapered portions was 77.5 mm. (see FIG. 4B) This fixation member was formed of stainless steel (SUS 430) having a Young's modulus of $1.97 \times 10^4$ kg/mm². The distance 47 between fixation members 3a and 3b as shown in FIG. 5 was set to 283 mm.

Stamper 1 and fixation members 3a and 3b were fixed to each other by electron beam welding, that is, they were welded with a welding jig 122 such as shown in FIG. 12 and an electron beam welding machine (commercial name: EBW6LB, a product from Mitsubishi Electric Corp.). The welding was performed under the following conditions: a vacuum of $5 \times 10^{-2}$ Torr, an acceleration voltage of 60 kV, a beam current of 3.2 mA, and a beam speed of 4.0 m/min.

On the other hand, the circumferential surface of a roll base formed of stainless steel was plated with chromium and was polished to form a specular surface having a surface roughness of 0.1 μm or lower, thereby forming a roll base 2 having a diameter of 310 mm and a width of 500 mm. On the circumferential surface of this roll base, a groove having a depth of 10 mm, a width of 13.1 mm and a length of 500 mm was formed as fit groove 9a, and another groove having a depth (d) of 10 mm, a width ($W_{9b}$) of 20.5mm and a length of 500 mm was formed as fit groove 9b shown in FIGS. 2 & 3. The distance 48 between fit grooves 9a and 9b as shown in FIG. 5 was set to 292.5 mm.

Fixation members 3a and 3b are fitted in fit grooves 9a and 9b and were temporarily fixed with screws 7a to an extent such that stamper 1 was movable. In this state, the clearance 43 as shown in FIG. 5 was 1.5 mm.

Wedges 6, fixed members 8-1 and pressing screws 8-2 constituting a tensile force application means were then disposed as shown in FIG. 2, and the pressing screws were advanced to press wedges 6, thereby applying a tensile force of 5 kgf/mm² to stamper 1. As wedges 6, stainless steel members in which the tapered portions had an angle θ' of 12.8°, a length 45 of 39 mm, a height of 10 mm and a width of 18.5 mm, were used. After the predetermined tensile force had been applied, screws 7 were fastened to firmly fix the fixation members 3b to roll base 2, manufacturing a roll stamper.

This roll stamper was attached to a molding machine such as shown in FIG. 8, and a polycarbonate resin was extruded from extruder 85, thereby manufacturing an optical card substrate sheet having a thickness of 0.4 mm. The molding was continuously performed for 10 hours under the following conditions: a T-die temperature of 300° C., a roll stamper 5 surface temperature of 145° C., and a resin sheet transport sheet of 3 m/min. The birefringence of the optical card substrate sheet thereby formed was as small as 10 to 15 nm and the performance of transferring the pre-format pattern was high. The surface temperature of flexible stamper 1 of roll stamper 5 immediately after the molding, was measured with an infrared radiation thermometer (commercial name: Thermal video system TVS-5000, a product from Nippon Avionics Co. Ltd.) to observe temperature unevenness at the surface of stamper 1. As the result of this measurement, the temperature difference was as small as at most 10° C. and the proportion of a region where a temperature unevenness occurred to the surface area of stamper 1 was only about 5%. It was thereby understood that the adhesion between roll base 2 and flexible stamper 1 was very even during molding.

Examples 2 to 4

Roll stampers 5 were manufactured and optical card substrate sheets were formed in the same manner as Example 1 except that the tensile force applied to the flexible stamper was changed as shown in Table 1 shown below. Surface temperature unevenness and the proportion of a region on flexible stamper 1 of roll stamper where temperature unevenness occurred to the surface area of flexible stamper 1 (area ratio) immediately after continuous molding for 10 hours, were evaluated in the same manner as in Example 1. The results of this evaluation are shown in Table 1.

TABLE 1

| Example No. | Tensile force | Temperature unevenness | Area ratio (%) |
|---|---|---|---|
| 2 | 10 | A | A |
| 3 | 17.5 | A | A |
| 4 | 20 | A | B |

*Evaluation criteria were as follows.
Temperature unevenness
AA: 10° C. or less
A: 10 < T ≦ 30° C.

Area ratio
AA: within 5%
A: within 15%
B: within 20%
C: greater than 20%

Reference Examples 1, 2

Roll stampers 5 were manufactured and optical card substrate sheets were formed in the same manner as Example 1 except that the tensile force applied to the flexible stamper was changed as shown in Table 2 below. The surface temperature and the proportion of a region on flexible stamper 1 of roll stamper 5 where temperature unevenness occurred to the surface area of flexible stamper 1 (area ratio) immediately after continuous molding for 10 hours, were measured and evaluated. The results of this evaluation are shown in Table 2(1).

TABLE 2(1)

| | Tensile force | Temperature difference | Area ratio (%) |
|---|---|---|---|
| Reference example 1 | 1 | AA | AA |
| Reference example 2 | 45 | A | C |

*Rubber was made to penetrate between roll base 2 and flexible stamper 1 so that the yield of the optical card substrate was reduced.

Reference Example 3

A roll stamper was manufactured and evaluated in the same manner as Example 1 except that the length (44) of tapered portions 3b-10 of fixation member 3b was set to 45 mm. The result of the evaluation is shown in Table 2(2).

TABLE 2(2)

| | Temperature unevenness | Area ratio |
|---|---|---|
| Reference example 3 | A | C |

Example 5

A lengthwise flexible stamper 1 having a length of 293 mm, a width of 37.7 mm and a thickness of 200 μm and having three optical card pre-format patterns on its obverse surface was manufactured in the same manner as in Example 1.

Fixation members 3a and 3b were fixed to both end portions of the reverse surface of the thus-obtained stamper 1. As fixation member 3a was used a stainless steel member having a length of 65 mm, a width of 13 mm and a height of 10 mm. Fixation member 3b was a member which had a cross-sectional shape such as shown in FIG. 3 having a height (h) of 10 mm and a width (W) of 18.5 mm, and a shape as viewed in plan having a length of 65 mm, the angle of θ of tapered portions 3b-10 of 10° and the length 44 of the tapered portions of 11 mm, and which was formed of stainless steel (SUS 430). Fixation members 3a and 3b were fixed to stamper 1 as shown in FIG. 6 by laser beam welding, that is, they were welded with a welding jig 122 such as shown in FIG. 12 and a YAG laser welding machine (commercial name: ML-2220A, a product from Miyaji Laser System K.K.) under the following conditions: a changing voltage of 350 V, a pulse width of 1.0 ms, an extent of defocus of 5 mm, a REP-RATE (PPS ) of 20, and power of 35 to 65 W.

On the other hand, the circumferential surface of a roll base formed of stainless steel was plated with chromium and was polished to form a specular surface having a surface roughness of 0.1 μm or lower, thereby forming a roll base 2 having a diameter of 310 mm and a width of 500 mm. In the circumferential surface of this roll base, a groove having a depth of 10 mm, a width of 13.1 mm and a length of 500 mm was formed as fit groove 9a, and another groove having a depth (d) of 10 mm, a width (W') of 20 mm and a length of 500 mm was formed as fit groove 9b shown in FIG. 3. The distance 48 between fit grooves 9a and 9b as shown in FIG. 5 was set to 292.5 mm.

Fixation members 3a and 3b were fitted in fit grooves 9a and 9b and were temporarily fixed with screws 7a to an extent such that stamper 1 was movable. In this state, the clearance 43 as shown in FIG. 5 was 1.5 mm.

Wedges 6, fixed members 8-1 and pressing screws 8-2 constituting a tensile force application means were then disposed as shown in FIG. 2, and the pressing screws were made to advance to press wedges 6, thereby applying a tensile force of 10 kgf/mm$^2$ to stamper 1. As wedges 6, stainless steel members in which the tapered portions had an angle θ' of 9.5°, a length 45 of 6 mm, a height of 10 mm and a width of 18.5 mm was used. After the predetermined tensile force had been applied, screws 7 were fastened to firmly fix the fixation members 3b to roll base 2, thus manufacturing a roll stamper.

This roll stamper was attached to a molding machine such as shown in FIG. 8, and a polycarbonate resin was extruded from extruder 85, thereby manufacturing an optical card substrate sheet having a thickness of 0.4 mm. The molding was continuously performed for 10 hours under the following conditions: a T-die temperature of 300° C., a roll stamper 5 surface temperature of 145° C., and a resin sheet transport speed of 3 m/min. The birefringence of the optical card substrate sheet thereby formed was as small as 10 to 15 nm and the performance of transferring the pre-format pattern was high. The surface temperature of flexible stamper 1 of roll stamper 5 immediately after the molding, was measured with an infrared radiation thermometer (commercial name: Thermal Video System TVS-5000, a product from Nippon Avionics Co., Ltd.) to observe temperature unevenness at the surface of stamper 1. As the result of this measurement, the temperature difference was as small as at most 10° C. and the proportion of a region where a temperature unevenness occurred to the surface area of stamper 1 was only about 5%. It was thereby understood that the adhesion between roll base 2 and flexible stamper 1 was very even during molding.

Examples 6, 7

The same stamper as the stamper 1 manufactured in accordance with Reference Example 3 was prepared.

A roll base 2 having a diameter of 310 mm and a width of 500 mm was formed by plating the circumferential surface of a stainless steel roll member with chromium and by finishing this surface as a specular surface having a surface roughness of 0.1 μm or lower. A groove having a depth of 10 mm, a width of 13.1 mm and a length of 500 mm was formed as a fit groove 9a in the circumferential surface of the roll base. A groove having a shape such as shown in FIG. 10A was formed as a fit groove 9b, which specifically, has a depth (d) of 10 mm, a width ($W_{9b}$) of 21 mm, a length of 500 mm, and an angle β=13.5°, and has tapered portions 101a having a length of 140 mm. The distance 48 between fit grooves 9a and 9b as shown in FIG. 6 was set to 292.5 mm.

Fixation members 3a and 3b were fitted in fit grooves 9a and 9b and were temporarily fixed with screws 7a to an extent such that stamper 1 was movable. In this state, the clearance 43 as shown in FIG. 5 was 1.5 mm.

Wedges 6, fixed members 8-1 and pressing screws 8-2 constituting a tensile force application means were then disposed as shown in FIG. 10B, and the pressing screws were advanced to press wedges 6, thereby applying tensile forces of 5 kgf/mm$^2$ and 20 kgf/mm$^2$ to stamper 1. As wedges 6, wedges having a shape such as shown in FIG. 11B were used. Each wedge 116 has a length ($l_{116}$) of 150 mm, the height ($h_{111a}$) of the tip projection was 1 mm, the depth of the notch (111b) was 0.5 mm, and both the angles θ' and β' were 12.8°. Each wedge 116 was tapered to have a height of 10 mm at its rear end and a height of 6 mm at its tip (see FIG. 11C).

A roll stamper thus manufactured was evaluated in the same manner as Example 2. The results of this evaluation are shown in Table 4.

Example 8

A roll stamper was manufactured in the same manner as Example 1 except that the fixation members used were those having trapezoidal cross-sectional shapes as shown in FIG. 6 (angle γ=45°), and that fit grooves 9a and 9b also had trapezoidal cross-sectional shapes (angle γ=45°) so as to be engageable with the fixation members. No screws 7 for fixing fixation members 3a and 3b to the roll base were used.

An optical card substrate sheet was molded by using this roll stamper in the same manner as Example 2, and the state of the roll stamper after the molding was evaluated. The results of evaluation are shown in Table 4.

TABLE 4

| Example | Tensile force | Temperature unevenness | Area ratio |
|---------|---------------|------------------------|------------|
| 6 | 5 kgf/mm² | AA | AA |
| 7 | 20 kgf/mm² | AA | AA |
| 8 | 5 kgf/mm² | AA | AA |

What is claimed is:

1. A process for preparing a substrate for an optical recording medium, comprising the steps of:
    preparing a roll stamper comprising:
        a stamper member having a pattern corresponding to a pre-format for an information recording medium formed on its obverse surface,
        fixation members fixed to both end portions of a reverse surface of said stamper so as to be integral with said stamper member,
        fit grooves capable of fittingly receiving said fixation members and formed on a circumferential surface of a specular roll base parallel to the axis of said specular roll base, said fixation members being fitted in said fit grooves, and said stamper member being fixed along the circumferential surface of said specular roll base,
        wedge means for applying a tensile force to said stamper member, including a wedge capable of being inserted between said fixation member and a wall portion of said fit groove, and
        pressing means for applying a pressing force to the wedge in a direction parallel to an axis of said roll stamper;
    extruding a molten resin from a die to form a resin sheet; and
    pressing said resin sheet in a substantially molten state between said roll stamper and a roll disposed opposingly to said roll stamper to transfer a preformat pattern to a surface of said resin sheet, said resin sheet thereby forming a substrate for an optical recording medium.

2. A process for preparing a resin sheet having a preformat pattern, comprising the steps of:
    preparing a roll stamper, by
        providing a stamper member having a pattern corresponding to the preformat pattern formed on its obverse surface, and having respective fixation members fixed to both end portions of a reverse surface of said stamper member so as to be integral with said stamper member,
        providing a specular roll base having fit grooves capable of receiving said fixation members on a surface of said specular roll base parallel to an axis of said specular roll base,
        fitting said fixation members in said fit grooves to fix said stamper member along the circumferential surface of said specular roll base, and
        inserting a wedge between at least one of said fixation members and a respective wall portion of said fit groove to apply a tensile force to said stamper member fixed along the circumferential surface of said specular roll base;
    extruding a molten resin from a die to form a resin sheet; and
    pressing said resin sheet in a substantially molten state between said roll stamper and a roll disposed opposingly to said roll stamper to transfer the preformat pattern to a surface of said resin sheet.

3. A process according to claim 2, wherein each fixation member has tapered portions formed at both its lengthwise ends, said tapered portions being capable of abutting against respective tapered surfaces of said wedges.

4. A process according to claim 3, wherein the tapered portions of said fixation members have an angle in the range of 8° to 45° from a line parallel to a lengthwise direction of said fixation members.

5. A process according to claim 4, wherein the tapered portions of said fixation members have an angle of 10° to 40° from a line parallel to the lengthwise direction of said fixation member.

6. A process according to claim 3, wherein an area of contact between a tapered surface of one of said wedges and a corresponding tapered portions of one of said fixation members is ¼ or more of the surface area of the tapered portion.

7. A process according to claim 6, wherein the area of contact between the tapered surface of said one wedge and the corresponding tapered portion of said one fixation member is ⅓ or more of the surface area of the tapered portion.

8. A process according to claim 3, wherein said fixation member is formed of a material having a Young's modulus of $7.4 \times 10^3$ to $9 \times 10^4$ kgf/mm³.

9. A process according to claim 3, wherein a cross-sectional area of said fixation member is 30 to 600 mm².

10. A process according to claim 3, wherein the tapered portion of said fixation member is formed so as to have a length which is ⅙ or greater of the length of the fixation member.

11. A process according to claim 10, wherein the tapered portion of said fixation member is formed so as to have a length which is ¼ or greater of the length of the fixation member.

12. A process according to claim 10, wherein the wedge is movable into said fixation member in a direction parallel to said roll stamper axis to an extent corresponding to ⅙ or greater of the length of the fixation member.

13. A process according to claim 10, wherein the wedge is movable into said fixation member in a direction parallel to said roll stamper axis to an extent corresponding to ¼ or greater of the length of the fixation member.

* * * * *

UNITED STATES PATENT AND TRADEMARK OFFICE
CERTIFICATE OF CORRECTION

PATENT NO. : 5,460,766
DATED : October 24, 1995
INVENTOR(S) : HIROFUMI KAMITAKAHARA, ET AL.

It is certified that error appears in the above-indentified patent and that said Letters Patent is hereby corrected as shown below:

Column 3
    Line 14, "s tamper" should read --stamper--.

Column 4

Line 7, "FIG." should read --FIGS.--.

Column 5

Line 19, "its" should read --their--.
    Line 37, "perferably" should read --preferably--.
    Line 66, "10mm$^2$," should read --10mm,--.

Column 7

Line 16, "wedges, 6" should read --wedges 6--.

UNITED STATES PATENT AND TRADEMARK OFFICE
CERTIFICATE OF CORRECTION

PATENT NO. : 5,460,766

DATED : October 24, 1995

INVENTOR(S) : HIROFUMI KAMITAKAHARA, ET AL.

It is certified that error appears in the above-indentified patent and that said Letters Patent is hereby corrected as shown below:

<u>Column 11</u>

Line 31, "s tamper," should read --stamper,--.

<u>Column 16</u>

Line 10, "was" should read --were--.

<u>Column 18</u>

Line 36, "portions" should read --portion--.

Signed and Sealed this

Twenty-sixth Day of March, 1996

*Attest:*

BRUCE LEHMAN

*Attesting Officer*     *Commissioner of Patents and Trademarks*